June 23, 1953 — W. J. RADY — 2,643,346
STARTING AND GENERATING SYSTEM
Filed Oct. 2, 1951 — 6 Sheets-Sheet 2

INVENTOR.
William J. Rady
BY Willits Hardman & Fehr
his attorneys

June 23, 1953 W. J. RADY 2,643,346
STARTING AND GENERATING SYSTEM
Filed Oct. 2, 1951 6 Sheets-Sheet 5

INVENTOR.
William J. Rady
BY
Willits Hardman & Fehr
his attorneys

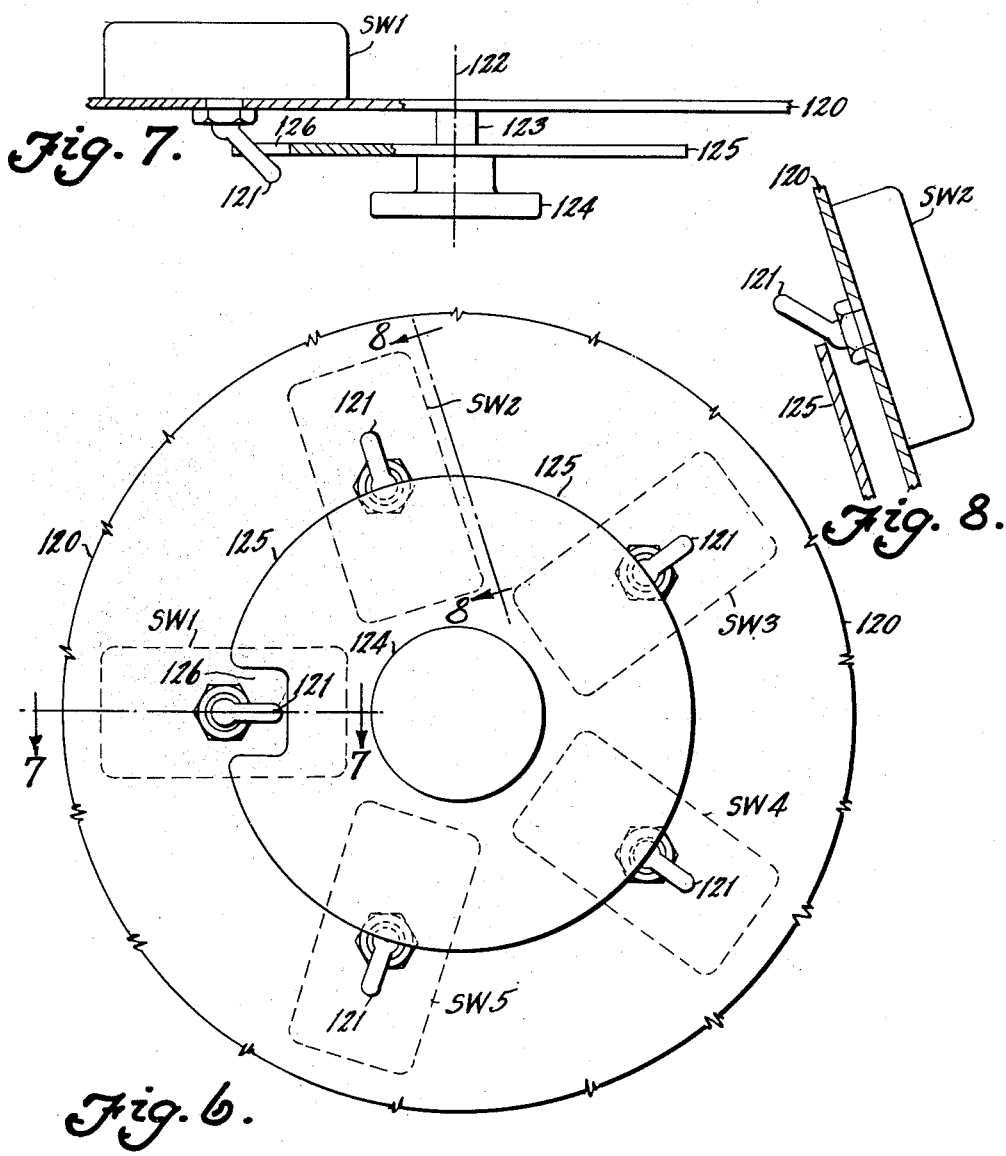

Patented June 23, 1953

2,643,346

UNITED STATES PATENT OFFICE 2,643,346

STARTING AND GENERATING SYSTEM

William J. Rady, Anderson, Ind., assignor to General Motors Corporation, Detroit, Mich., a corporation of Delaware Application October 2, 1951, Serial No. 249,369

6 Claims. (Cl. 290—31)

This invention relates to power plants for generating electric current for charging a storage battery and for other uses and, more particularly, to a plant including a dynamoelectric machine driven by an internal combustion engine and operable as a motor to crank the engine as well as a generator.

An object of the invention is to provide a system of control whereby the machine can be used to crank the engine or to charge the battery or to supply load circuit current at different voltages.

A further object of the invention is to provide for manual control of the system by the use of switches which can be selectively operated to effect engine cranking, battery charging or load circuit current supply at a selected voltage. In this connection, another object is to prevent the use of more than one switch at a time.

Further objects and advantages of the present invention will be apparent from the following description, reference being had to the accompanying drawings wherein a preferred embodiment of the present invention is clearly shown.

In the drawings:

Fig. 6 is a fragmentary front view of a switch mounting panel which supports control switches on the rear thereof having operating handles located in front of the panel.

Fig. 7 is a fragmentary view in the direction of arrow 7 of Fig. 6, the part in section being on line 7—7 of Fig. 6.

Fig. 8 is a fragmentary sectional view on line 8—8 of Fig. 6.

Figure 1:
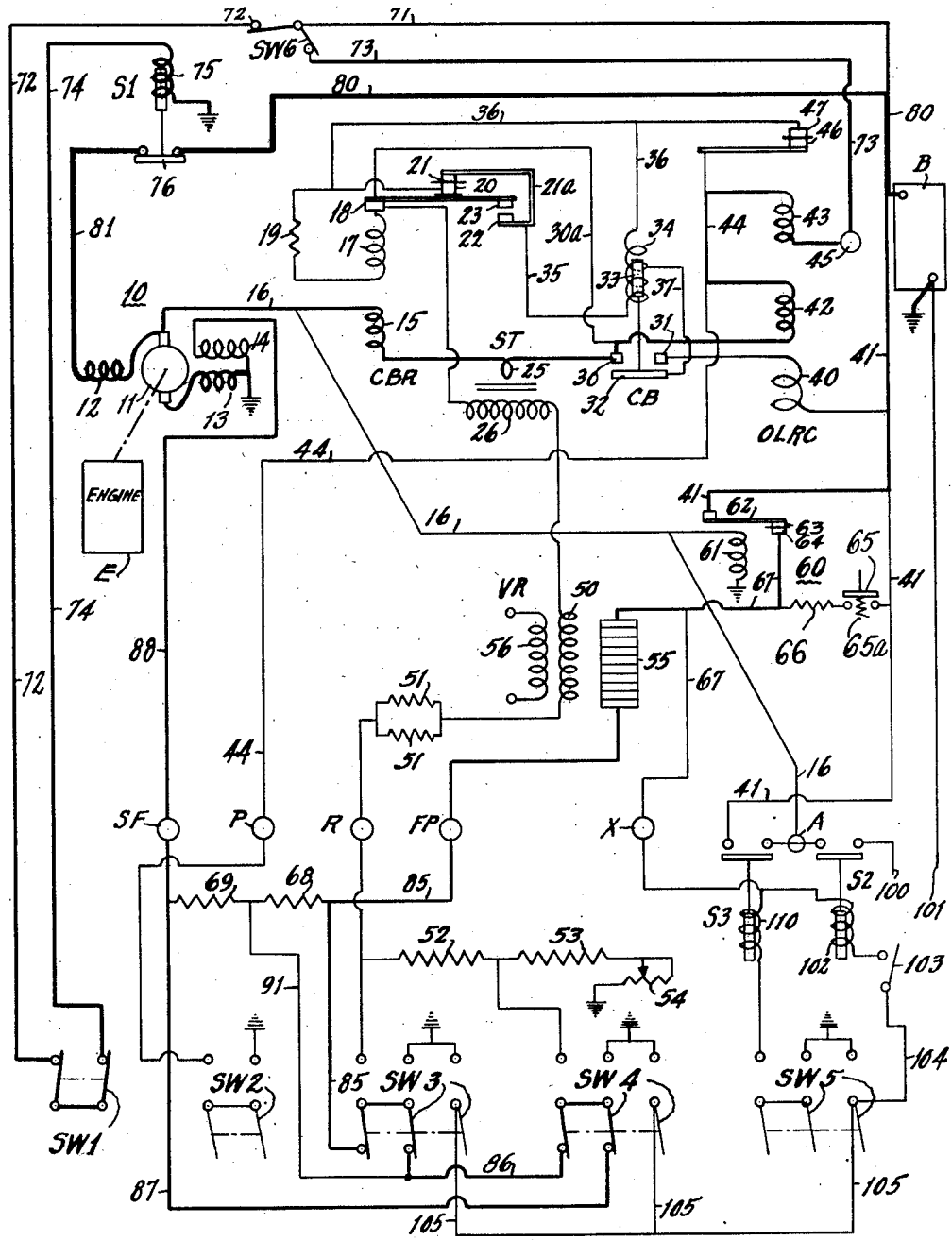
Fig. 1 is a wiring diagram of the system conditioned for the engine cranking function.

Referring to Fig. 1, the system includes a dynamoelectric machine 10 having an armature 11, a series field winding 12 used for engine cranking purposes, an interpole series field 13 and a shunt series field winding 14.

The connection of the machine 10 with battery B is under control by circuit breaker relay CBR having a coil 15 connected with armature 11 by wire 16 and having a coil 17 connected with an armature 18 and with a wire 19 connected with a contact 20 insulated from armature 18 for normally engaging a contact 21 which a bracket 21a connects with a contact 22 normally separated from a contact 23 carried by armature 18.

Coil 15 connects with primary winding 25 of a stabilizing transformer ST having a secondary winding 26. The operation of transformer ST is described in Rady and Rice Patent 2,544,179 issued March 6, 1951. A circuit breaker CB controlled by relay CBR includes fixed contacts 30 and 31 which are engageable by a bridging contact 32 attached to an armature 33 within a coil 34 connected at one end with a wire 36 and connected at the other end by wire 35 with bracket 21a. A mid point of coil 34 is connected by wire 37 with contact 32. Contact 30 is connected with transformer primary coil 25.

An overload reverse current relay OLRC, which is disclosed in Rady and Rice Patent 2,554,383 issued May 22, 1951, and in Rady application S. N. 215,272 filed March 13, 1951, now Patent No. 2,616,054 issued October 28, 1952, has a coil 40 connected with contact 31 of circuit breaker CB and connected by a wire 41 with battery B. Relay OLRC has coils 42 and 43 one end of each being connected with a wire 44. One end of coil 42 is connected with contact 30 of circuit breaker CB. One end of coil 43 is connected with a terminal 45. Wire 44 is connected with a movable contact 46 normally engaged with a fixed contact 47.

A voltage regulator VR has an actuating coil 50 connected with the secondary winding 26 of transformer ST and with parallel resistances 51 in series with resistances 52, 53 and 54. Regulator VR has also a coil 56 which is used when the system operates in parallel with a similar system.

A relay 60 has a magnet coil 61 grounded at one end and connected with wire 16 and an armature 62 connected with wire 41 and carrying a contact 63 for engaging a contact 64. Relay 60 closes contacts 63 and 64 when coil 61 receives 16 volts and holds the contacts closed until the voltage drops to 3 volts. A by-pass around contacts 63 and 64, when open, can be effected by closing a switch 65 connecting wire 41 with a wire 67 through a resistance 66. Contact 64 is connected by wire 67 with a terminal X and with the carbon pile 55 of regulator VR which is connected by a terminal FP with resistances 68 and 69.

The internal combustion engine E which drives the dynamo 10 as a generator, is supplied with ignition by any suitable ignition apparatus, such as a magneto which can be controlled by a switch, not shown, movable to various positions, such as starting, running and stopping positions, and is coordinated with a switch SW6 so as to operate said switch to control the connection of wires 71, 72 and 73. When the magneto switch is in starting position, switch SW6 is in the Fig. 1 position. Wire 71 is connected with wire 80 which is connected with battery B. Wire 72 is connected with a switch SW1. When it is desired to crank the engine switch SW1 is closed as shown in Fig. 1 thereby connecting the wire 72 with a wire 74 connected with the magnet coil 75 of a solenoid switch S1 which is then energized to cause a contact 76 to connect a wire 80 with a wire 81 connected with series field winding 12. Therefore, the concurrent closure of switches SW6 and SW1 causes current to flow from the battery B through the series field winding 12, armature 11 and interpole winding 13 of dynamo 10 to cause it to operate as a motor to crank the engine.

Shunt field winding 14 also receives current to excite the dynamo 10 for engine cranking purposes. This is effected by the closing of contacts 63 and 64 of relay 60 which occurs because its coil 61 receives current from battery B through wire 16 at a voltage above that (16 volts, for example) required to overcome the upward bias of armature 62. The circuit of winding 14 includes wire 41, armature 62, contacts 63, 64, wire 67, carbon pile 55, terminal FP, wire 85, switches SW3 and SW4 (then down), wire 87, terminal SF and wire 88. Relay 60 having closed its contacts 63 and 64 during engine cranking by dynamo 10, these contacts remain closed until the engine practically stops because relay 60 holds its contacts closed until the voltage on coil 61 drops to about 3 volts. Thereafter, while the engine is running, the battery supplies current to the shunt field winding 14 except when the dynamo 10 is operating as a generator to charge the battery. When the engine stops, relay 60 opens its contacts 63, 64 so that the battery cannot discharge either through the field winding 14 or to coil 102 of solenoid switch S2 or to coil 110 of solenoid switch S3 even though switch SW5 were moved to "up" position shown in Fig. 5 and load circuit control switch 103 were closed. Therefore, no current can be obtained from the battery B for load circuit purposes while the dynamo 10 is not running.

It is desirable that the closure of contacts 63, 64 of relay 60 should accompany the starting operation whether the engine be started by operation of the dynamo 10 or by hand-cranking. During hand-cranking it is not necessary for the shunt field winding 14 to be connected. After the engine has been started switch 65 is closed momentarily so that the shunt field winding 14 receives current from the battery. Then, after generator voltage has attained about 17 volts coil 61 of relay 60 is energized sufficiently to close contacts 63, 64 and switch 65 can be released. Obviously, the engine is hand-cranked at a rate such that dynamo 10 would not put out a voltage sufficient to cause relay 60 to close its contacts even though its shunt field were excited by the battery.

During cranking, the coil 43 of relay OLRC receives current to effect separation of contact 46 from 47 for a purpose which is useful in parallel operation of two systems like the system disclosed herein. That purpose is described in my copending application S. N. 215,272 filed March 13, 1951.

Figure 2:
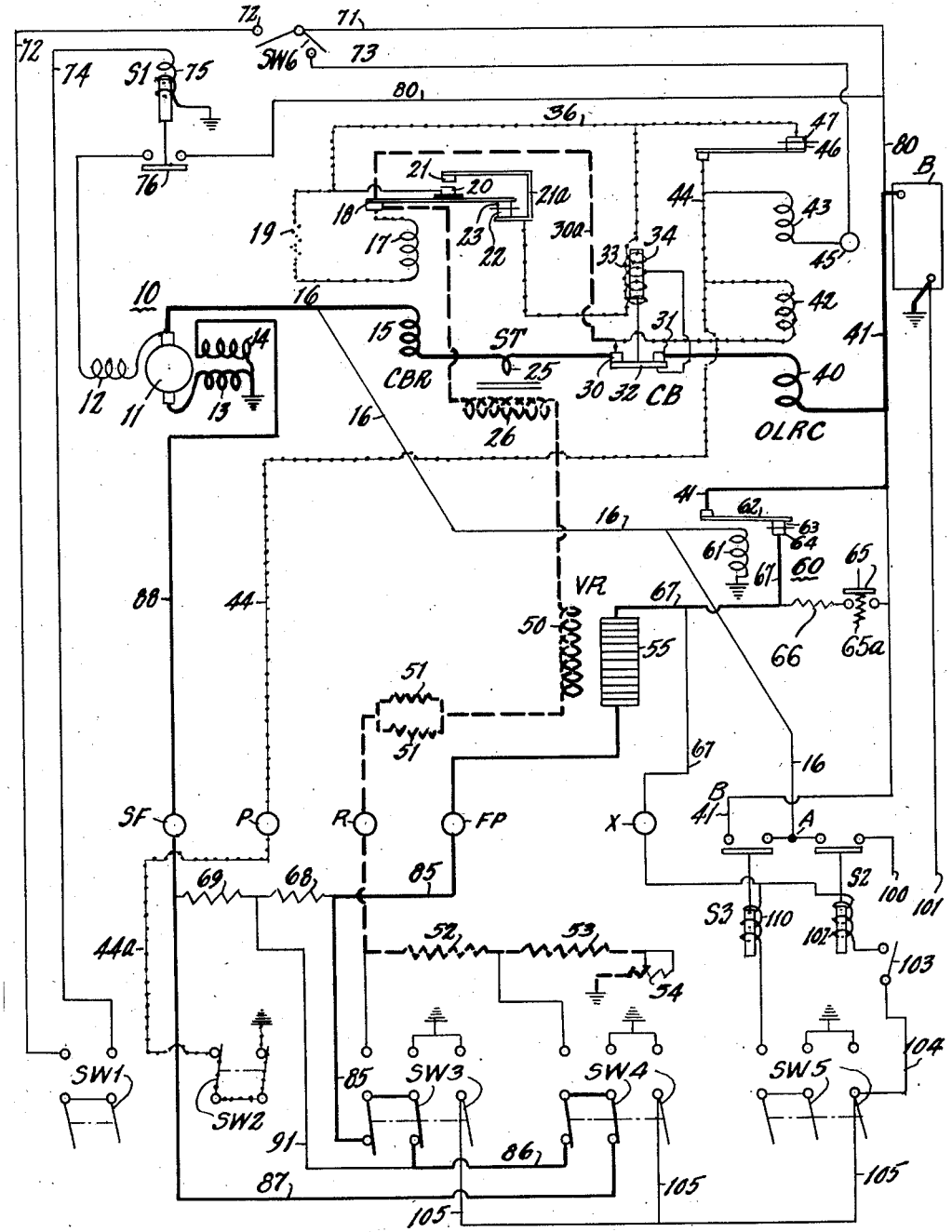
Fig. 2 is a wiring diagram of the system conditioned for battery charging.

After the engine has been started, the magneto control switch is moved to run position and switch SW6 is caused to open as shown in Fig. 2. Coil 43 of relay OLRC becomes de-energized and contacts 46 and 47 engage. If battery charging is required, switch SW1 is opened and switch SW2 is closed as shown in Fig. 2. Other switches SW3, SW4 and SW5 remain in down positions as shown in Fig. 2. Then the dynamo 10, operating as a generator, becomes connected with battery B through a circuit indicated by heavy lines which includes the grounded interpole winding 13, armature 11, wire 16, coil 15 of relay CBR, primary winding 25 of transformer ST, contacts 30, 32 and 31 of circuit breaker CB, coil 40 of relay OLRC, wire 41, battery B and ground. However, before this circuit is completed, coil 15 of relay CBR receives current from the generator through the following circuit: ground, interpole winding 13, armature 11, wire 16, coil 15, coil 25, contact 30, wire 30a, coil 17, resistance 19, wire 36, contacts 47, 46, wire 44, terminal P, wire 44a, switch SW2 and ground. Coil 17 becomes sufficiently energized to effect movement of armature 18 from the position shown in Fig. 1 to that shown in Fig. 2 and contact 23 engages contact 22 and contact 20 separates from contact 21. The coil 33 of circuit breaker CB becomes connected in parallel with coil 17 and is sufficiently energized to cause contact 32 to engage contacts 30 and 31 to complete the battery charging circuit. Coil 42 of relay OLRC also receives current and it operates in bucking relation to coil 40 so that so long as current flows from the dynamo 10 to the battery, contact 46 remains in engagement with contact 47. After the contact 23 of relay CBR engages contact 22, these may separate in case of decrease of generator voltage but not too low as to cause current to flow from the battery to the generator. Nevertheless coil 33 will remain sufficiently energized to maintain contact 32 into engagement with contacts 30 and 31 since a portion of coil 33 is then directly connected with contact 32.

In case generator voltage falls below battery voltage, the coils of relay CBR will not be sufficiently energized to maintain closure of contacts 23 and 22 and contact 20 will engage contact 21 and coil 33 will be short-circuited and contact 32 will separate from contacts 30 and 31 and the charging circuit will be interrupted. If the voltage of the generator should very suddenly decrease to a substantially zero value, there might not be time enough for relay CBR to operate to control circuit breaker CB to interrupt the connection with the battery and the generator. Nevertheless the battery circuit to the generator will be interrupted because there will be a momentary flow of relatively high current from the battery through the coil 40 which will then act in aiding relation with respect to coil 42 to cause separation of contact 46 from contact 47 and coils 33 and 17 will be open-circuited and circuit breaker CB will open.

The circuit of shunt field 14 of the generator 10 becomes completed by the closure of contacts 63 and 64 of relay 60. This is effected by the energization of coil 61 which is connected with wire 16 and with ground. The shunt field circuit when thus completed is indicated by medium, solid lines in Fig. 2 and includes armature 11, the charging circuit to wire 41, contacts 63 and 64 of relay 60, wire 67, carbon pile 55 of regulator VR, terminal FP, wire 85, switch SW3, wire 86, switch SW4, wire 87, terminal SF, wire 88, shunt field coil 14, interpole coil 13 and armature 11.

This is the shunt field circuit when the generator is charging the battery. Otherwise the battery B supplies the shunt field excitation.

The circuit of voltage regulator control coil 50 includes ground, interpole winding 13, armature 11, the charging circuit to contact 30, wire 30a, secondary coil 26 of transformer ST, coil 50, resistance 51, terminal R and resistances 52, 53 and 54 to ground. Resistance 54 can be adjusted so that the voltage regulator will operate to control the voltage output of the generator at a value suitable for battery charging, for example, if the battery is a 24-volt battery, the generator output will be controlled for a suitable charging voltage above 24 volts.

Figure 3:
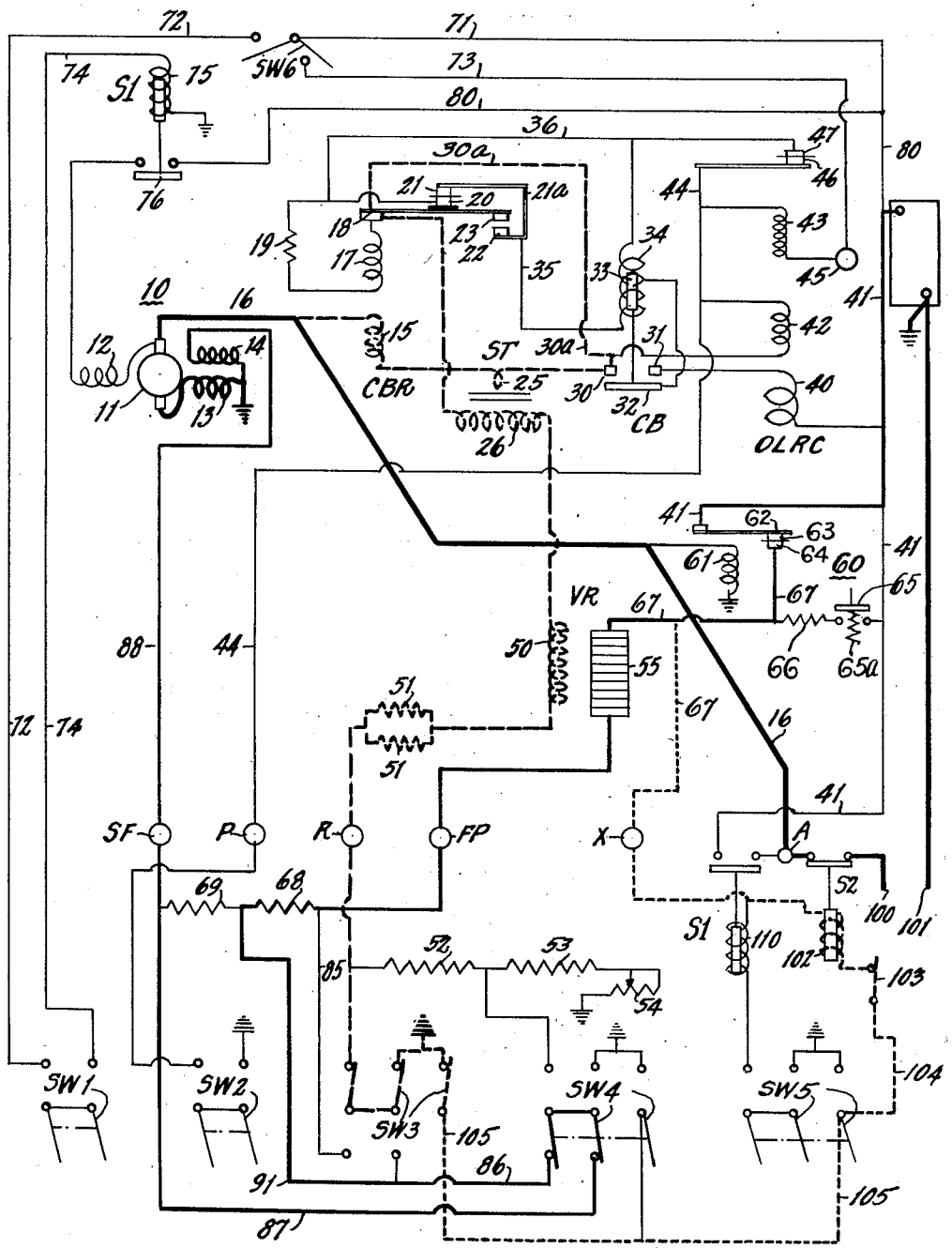
Fig. 3 is a wiring diagram of the system conditioned for lowest voltage supply to a load circuit.

When not charging the battery, the generator can be used to supply current to a load circuit which includes wires 100 and 101 as shown in Fig. 3. When it is desired to supply to this circuit current at 6 volts, for example, switch SW3 is moved to the up position shown in Fig. 3. The system is then conditioned for six-volt operation.

The shunt field 14 is excited by battery B, and its circuit wire 41, armature 62 and contacts 63 and 64 of relay 60 which remain closed above 3 volts, wire 67, carbon pile 55, terminal FP, wire 85, a resistance 68, wire 91, wire 86, switch SW4, wire 87, terminal SF and wire 88. Resistance 68 is such as to limit field current to a value consistent with six-volt operation.

The circuit of the regulator control coil 50 is indicated generally in coarse dash lines in Fig. 3. It includes ground, interpole coil 13, armature 11, wire 16, coil 15 of relay CBR, primary coil 25 of transformer ST, contact 30, wire 30a, armature 18, secondary coil 26, coil 50, resistance 51, terminal R, switch SW3 and ground. Since resistances 52, 53 and 54 are short-circuited by switch SW3, regulator VR will operate to control the generator field for a six-volt output. Wire 16 is connected with a terminal A which can be connected with load circuit wire 100 by solenoid switch S2 whose coil 102 can be energized, relay contacts 63 and 64 being closed, when a manually operated switch 103 is closed to complete a circuit which includes wire 41, contacts 63 and 64 of relay 60, wire 67, terminal X, coil 102, switch 103, wire 104, wire 105, switch SW3, and ground. From wire 67, the circuit of solenoid coil 102 is indicated by short dash lines.

Figure 4:
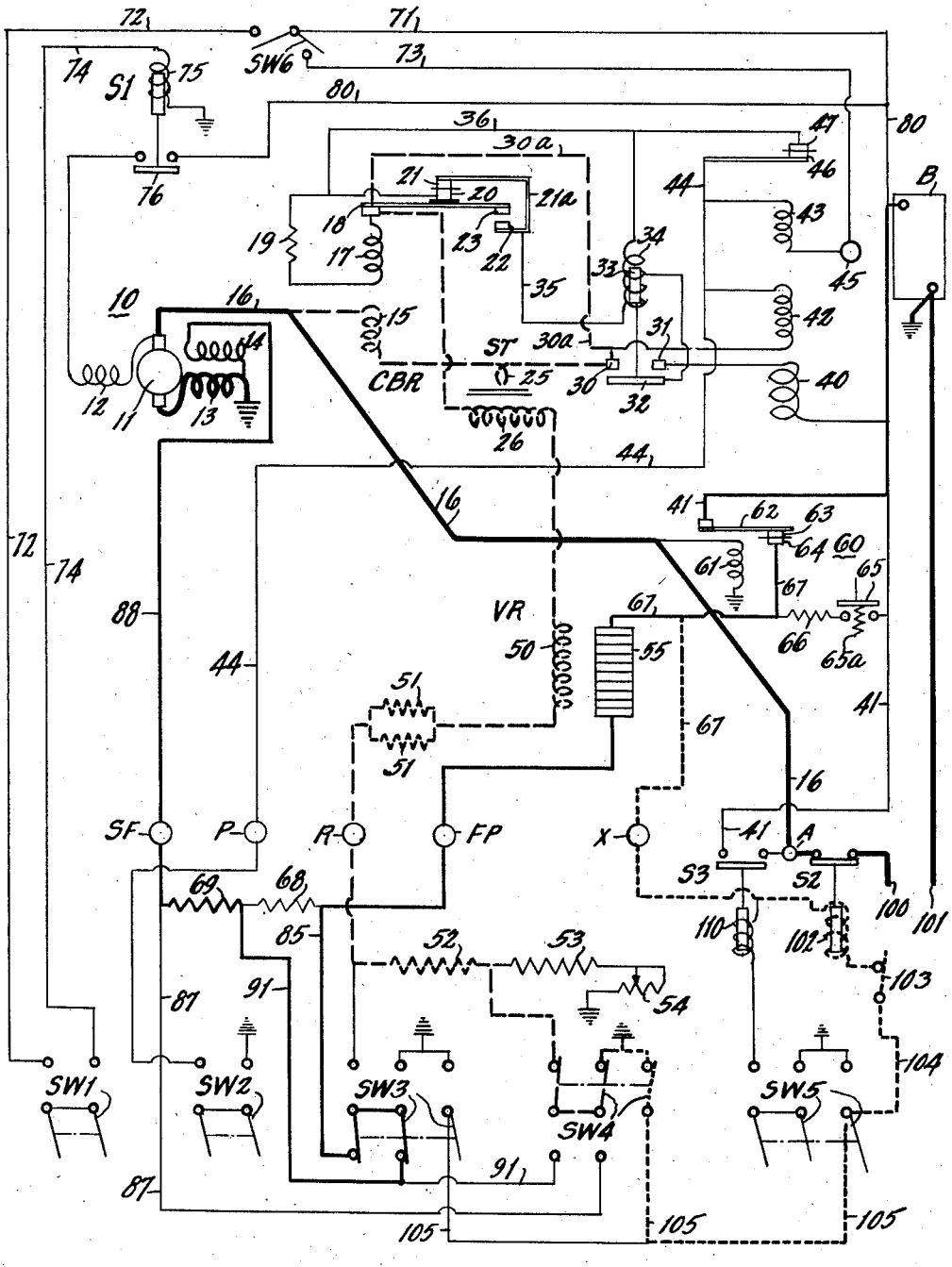
Fig. 4 is a wiring diagram of the system conditioned for intermediate voltage supply to a load circuit.

When the load, connected with wires 100 and 101, requires a voltage between the lowest and the highest, for example, 12 volts, a switch SW4 is moved to up position and switches SW1, SW2, SW3 and SW5 are down as shown in Fig. 4. In the down position of switch SW3, the short-circuit of the series of resistances 52, 53 and 54 is removed; and switch SW4, in the up position, renders effective the resistance 52 and short circuits both resistances 53 and 54 so that the voltage regulator coil 50 will control for twelve volt operation. The circuit of the shunt field 14 is the same as in Fig. 3 with the following exception: a resistance 69 is inserted in place of resistance 68 as shown in Fig. 3, the latter being short-circuited by the bridging of wires 85 and 91 by switch SW3 in down position. Switch SW4 completes a circuit of coil 102 of solenoid relay S2 instead of switch SW3.

Figure 5:
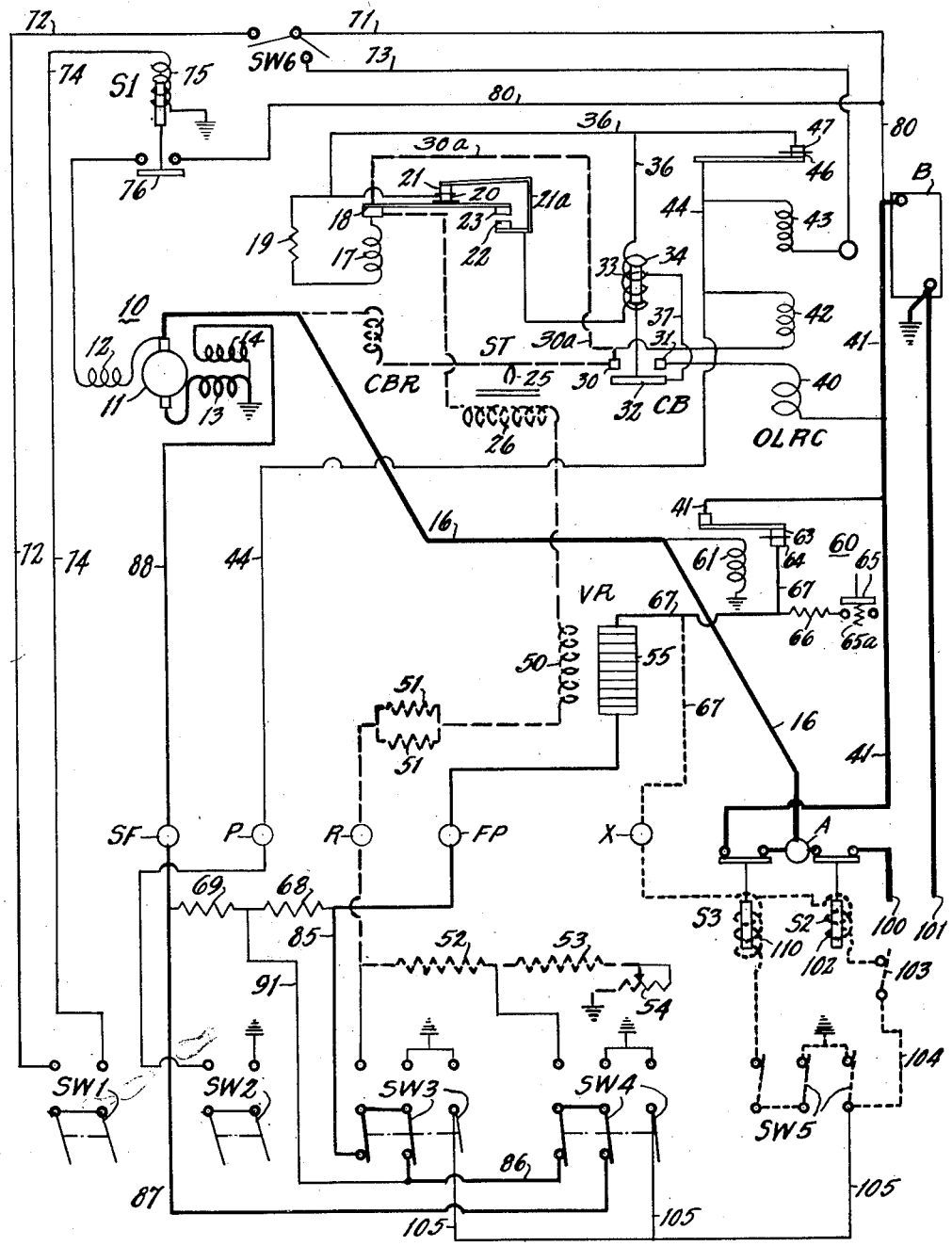
Fig. 5 is a wiring diagram of the system conditioned for highest voltage supply to a load circuit.

When the loads connected with lead wires 100 and 101 require 24 volts, the system is conditioned as shown in Fig. 5 by moving switch SW5 up, the other switches SW1, SW2, SW3 and SW4 being down. The voltage regulator coil 50 is then connected with the resistances 51, 52, 53 and 54 as was the case for the battery charging as shown in Fig. 2. Initially, the shunt field is excited from the battery B since contacts 63 and 64 of relay 60 are still closed. Since wire 67 is connected with battery B, the switch SW5 in the position shown in Fig. 5 completes the energizing circuits, respectively, of coils 102 and 110 of solenoids S2 and S3 which close their contacts so that wire 16 is connected with wire 41. Then shunt field excitation will be provided by the generator if it is charging the battery. Both the battery wire 41 and generator wire 16 are connected with load circuit wire 100. The other load circuit wire 101 is connected with the grounded terminal of the battery. Therefore, the load will be supplied with current by the generator while the battery floats on the line; but, if the current demand is high enough, the battery B will supply a part of the demanded current.

In order that only one switch at a time of the switches SW1–SW5 can be moved into up position from a down position, as viewed in Figs. 1–5, these switches are mounted, as shown in Fig. 6, on the back of a panel 120 which provides for location of the actuating members 121 of these switches at the front of the panel. These switches are located in a circular row about the axis 122 of a shaft 123 carrying a knob or handle 124 on a disc 125 having a notch 126. When any of the switch handles 124 extend in a direction toward the axis of the shaft 123, the switch is in a position corresponding to the up position shown in Figs. 1 to 5 and when the switch handle extends away from the axis of shaft 123, the switch is then in the condition represented by the down positions of the switches in Figs. 1 to 5. These switches are toggle, snap-action switches, that is, their handles either point in or they point out. There is no intermediate position. When it is desired to crank the engine, as shown in Fig. 1, the disc 125 is turned so that its notch 126 will be in a position adjacent the handle of switch SW1 so that it can be moved in as shown in Fig. 6 to cause switch SW1 to be conditioned as shown in Fig. 1. Obviously, none of the other switch handles can be moved toward the axis of shaft 123 far enough for these to be conditioned as represented by the up positions in Figs. 1–5. Consequently, only one switch at a time can be moved from a lower to an upper position as viewed in Figs. 1–5.

While the embodiment of the present invention as herein disclosed constitutes a preferred form, it is to be understood that other forms might be adopted.

What is claimed is as follows:

1. An electrical system comprising a dynamo connected with an internal combustion engine and operable as a motor to crank the engine or as a generator driven by the engine and having an armature and series and shunt field windings, a storage battery, a voltage regulator having a resistance in the circuit of the shunt field winding and having a resistance controlling magnet coil responsive to a generator voltage, resistance external to the voltage regulator resistance and operative to determine shunt field excitation in accordance with resistance value, resistance external to the magnet coil of the voltage regulator and operative to determine the extent of magnet coil excitation in accordance with resistance value and having normally that value required for a voltage setting of the regulator required for battery charging, a relay having a magnet coil connected with the dynamo armature and having contacts which are closed when the magnet coil receives battery current during engine starting, said relay contacts making a connection for connecting the battery with the shunt field winding, a plurality of manually operable switches having first and second positions, a circuit established by one of the switches in its second position for causing the connection of the battery with the dynamo armature and series field winding for engine cranking purposes, and a circuit connection established by other of the switches in first position for completing, in conjunction with the closed relay contacts, a circuit between the battery and the shunt field winding and one which determines that value of the resistance external to the voltage regulator resistance in the shunt field circuit which is required for shunt field excitation during engine cranking.

2. An electrical system comprising a dynamo connected with an internal combustion engine and operable as a motor to crank the engine or as a generator driven by the engine and having an armature and series and shunt field windings, a storage battery, a voltage regulator having a resistance in the circuit of the shunt field winding and having a resistance controlling magnet coil responsive to a generator voltage, resistance external to the voltage regulator resistance and operative to determine shunt field excitation in accordance with resistance value, resistance external to the magnet coil of the voltage regulator and operative to determine the extent of magnet coil excitation in accordance with resistance value and having normally that value required for a voltage setting of the regulator required for battery charging, a relay having a magnet coil connected with the dynamo armature and having contacts which are closed when the magnet coil receives battery current during engine starting, said relay contacts making a connection for connecting the battery with the shunt field winding, a plurality of manually operable switches having first and second positions, means for connecting the dynamo with the battery so that the former may charge the latter, a circuit established by one of the switches in its second position for rendering operative said means to connect the dynamo with the battery when the dynamo, acting as a generator, puts out a certain voltage exceeding battery voltage, and a circuit connection established by the other of the switches in first position for completing, in conjunction with the closed relay contacts, a circuit between the battery and the shunt field winding and one which determines that value of the resistance external to the voltage regulator resistance in the shunt field circuit which is required for shunt field excitation during battery charging.

3. An electrical system comprising a dynamo connected with an internal combustion engine and operable as a motor to crank the engine or as a generator driven by the engine and having an armature and series and shunt field windings, a storage battery, a voltage regulator having a resistance in the circuit of the shunt field winding and having a resistance controlling magnet coil responsive to a generator voltage, resistance external to the voltage regulator resistance and operative to determine shunt field excitation in accordance with resistance value, resistance external to the magnet coil of the voltage regulator and operative to determine the extent of magnet coil excitation in accordance with resistance value and having normally that value required for a voltage setting of the regulator required for battery charging, a relay having a magnet coil connected with the dynamo armature and having contacts which are closed when the magnet coil receives battery current during engine starting, said relay contacts making a connection for connecting the battery with the shunt field winding, a plurality of manually operable switches having first and second positions, a circuit established by one of the switches in its second position for determining the resistance value of resistance external to the voltage regulator coil so that the voltage regulator is set for regulation at a voltage lower than that required for battery charging, and a circuit connection established by other of the switches in first position for completing, in conjunction with the closed relay contacts, a circuit between the battery and the shunt field winding and one which determines that value of the resistance external to the voltage regulator resistance in the shunt field circuit which is required for shunt field excitation during lower output voltage, and a circuit for causing the establishment of a connection between the dynamo and a load circuit, said causing circuit including the battery, the closed contacts of said relay, and a circuit connection established by the said one of the switches in its second position.

4. An electrical system comprising a dynamo connected with an internal combustion engine and operable as a motor to crank the engine or as a generator driven by the engine and having an armature and series and shunt field windings, a storage battery, a voltage regulator having a resistance in the circuit of the shunt field winding and having a resistance controlling magnet coil responsive to a generator voltage, resistance external to the voltage regulator resistance and operative to determine shunt field excitation in accordance with resistance value, resistance external to the magnet coil of the voltage regulator and operative to determine the extent of magnet coil excitation in accordance with resistance value and having normally that value required for a voltage setting of the regulator required for battery charging, a relay having a magnet coil connected with the dynamo armature and having contacts which are closed when the magnet coil receives battery current during engine starting, said relay contacts making a connection for connecting the battery with the shunt field winding, a plurality of manually operable switches having first and second positions, a circuit for causing the establishment of connections between a load circuit and the dynamo and the battery, said causing circuit including the battery, the closed contacts of said relay and circuit connections established by one of said switches in its second position, a circuit connection established by other of the switches in first position for completing, in conjunction with the closed relay contacts, a circuit between the battery and the shunt field winding and one which determines that value of the resistance external to the voltage regulator resistance in the shunt field circuit which is required for field excitation for dynamo output at the voltage sufficient for battery charging.

5. An electrical system comprising a dynamo connected with an internal combustion engine and operable as a motor to crank the engine or as a generator driven by the engine and having an armature and series and shunt field windings, a storage battery, a voltage regulator having a resistance in the circuit of the shunt field winding and having a resistance controlling magnet coil responsive to a generator voltage, resistance external to the voltage regulator resistance and operative to determine shunt field excitation in accordance with resistance value, resistance external to the magnet coil of the voltage regulator and operative to determine the extent of magnet coil excitation in accordance with resistance value and having normally that value required for a voltage setting of the regulator required for battery charging, a relay having a magnet coil connected with the dynamo armature and having contacts which are closed when the magnet coil receives battery current during engine starting, said relay contacts making a connection for connecting the battery with the shunt field winding, first, second, third, fourth and fifth manually operable switches each having first and second positions, means for permitting only one of switches at a time to be moved from its first to its second position and preventing operation of the others to their second positions, a circuit established by the first switch in its second position for causing the connection of the battery with the dynamo armature and series field winding, a circuit connection established by the third and fourth positions in their first position for completing, in conjunction with the closed relay contacts, a circuit between the battery and the shunt field winding and one which short circuits shunt field circuit resistance external to the voltage regulator resistance, means for connecting the dynamo with the battery so that the former may charge the latter, a circuit established by the second switch in its second position for rendering operative said means to connect the dynamo with the battery when the dynamo, acting as a generator, puts out a certain voltage exceeding battery voltage, a circuit established by the third switch in its second position for short circuiting an amount of resistance external to the voltage regulator coil such that the regulator is set for control at relatively low voltage, a circuit established by the fourth switch in its first position for completing, in conjunction with the relay contacts, a circuit between the battery and the shunt field winding and one which by-passes an amount of the resistance external to the regulator controlled resistance such that the remainder limits shunt field excitation to a value suitable for low voltage output, means for connecting the dynamo with a load circuit, a circuit for rendering the last named means operative and including the battery, the closed relay contacts and a connection established by the third switch in its second position, a circuit connection established by the fourth switch in its second position for by-passing such portion of the resistance external to the voltage regulator coil that the voltage regulator is set to control voltage to a value intermediate said lower voltage and battery charging voltage, a circuit established by said fourth switch in its second position for completing the circuit which renders operative the dynamo-to-load circuit connecting means, a circuit established by the third switch in its first position for effecting, in conjunction with the closed contacts of the relay, a connection between the battery and the shunt field winding and one which by-passes such portion of the shunt field circuit resistance external to the regulator controlled resistance that shunt field excitation is limited to a value suitable for said intermediate voltage output, means for connecting the battery as well as the dynamo with a load circuit, and a circuit for rendering said last named means operative and including the battery, the closed contacts of the relay and a connection established by the fifth switch in its second position.

6. An electrical system according to claim 1 which includes another manually operable switch for establishing a circuit connection between the battery and the shunt field coil independently of the relay whereby, during hand-cranking of the engine, the dynamo driven by the engine can put out a voltage sufficient to effect closing of the relay contacts.

WILLIAM J. RADY.

References Cited in the file of this patent

UNITED STATES PATENTS

| Number | Name | Date |
|---|---|---|
| 1,282,969 | Soans | Oct. 29, 1918 |
| 1,297,768 | Wilson | Mar. 18, 1919 |
| 1,389,716 | Van Vleet | Sept. 6, 1921 |
| 1,401,352 | Mooney | Dec. 27, 1921 |
| 1,633,780 | Fitzsimmons | June 28, 1927 |
| 2,151,487 | Schaeren | Mar. 21, 1939 |
| 2,372,438 | Linder | Mar. 27, 1945 |
| 2,544,179 | Rady et al. | Mar. 6, 1951 |
| 2,554,383 | Rady et al. | May 22, 1951 |
| 2,616,054 | Rady | Oct. 28, 1952 |